United States Patent [19]

Gellert

[11] 4,026,518
[45] May 31, 1977

[54] BUSHING SEAL FOR VALVE-GATED INJECTION MOLD

[76] Inventor: Jobst Ulrich Gellert, 11 Newton Road, Brampton, Ontario, Canada

[22] Filed: Feb. 4, 1976

[21] Appl. No.: 655,056

[30] Foreign Application Priority Data

Apr. 10, 1975 Canada .............................. 224358

[52] U.S. Cl. ............................ 251/330; 425/242 R
[51] Int. Cl.² ......................................... F16K 41/14
[58] Field of Search .......................... 251/330, 143; 425/242 R; 137/219

[56] References Cited

UNITED STATES PATENTS

| 2,543,102 | 2/1951 | Franck | 251/330 |
| 2,753,884 | 7/1956 | Lindsay | 137/219 X |
| 2,925,091 | 2/1960 | Speisman | 251/330 X |

Primary Examiner—Arnold Rosenthal

[57] ABSTRACT

This invention relates to a bushing seal for a heater of a valve-gated injection mold. In a single cavity application, the heater is advantageously located directly between the molding machine and the cavity and a valve pin is reciprocated in a cylindrical bore through the bushing seal seated in the upper surface of the heater. The hot runner passage also extends through the bushing seal and joins the heater bore directly beneath the bushing seal. The cylindrical wall of the bore through the bushing seal is interrupted by a circumferential opening vented to atmosphere through a vent passage which relieves the build up of pressure between the valve pin and the wall of the bore and vents corrosive gases to substantially reduce corrosion and wear of the valve pin. A circular valve seat on the bottom face of the bushing seal receives an inclined shoulder on the valve pin to seal the bore of the bushing seal from the molten plastic material in the hot runner passage when the valve pin is in its uppermost position. This reduction in corrosion and wear reduces malfunctioning of the mechanism due to seizure of the valve pin in the bushing seal.

2 Claims, 3 Drawing Figures

U.S. Patent   May 31, 1977   4,026,518
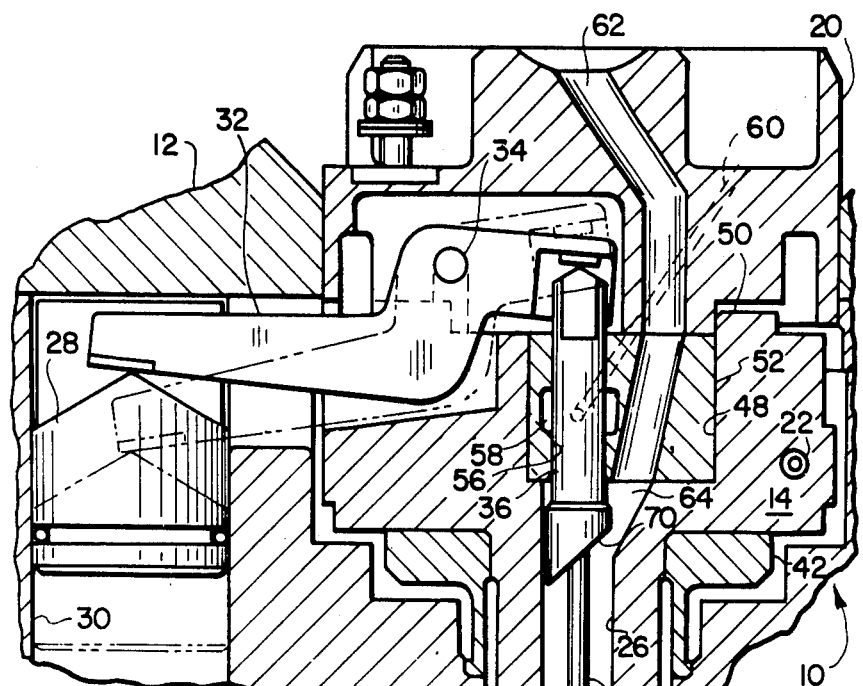
Fig. 1
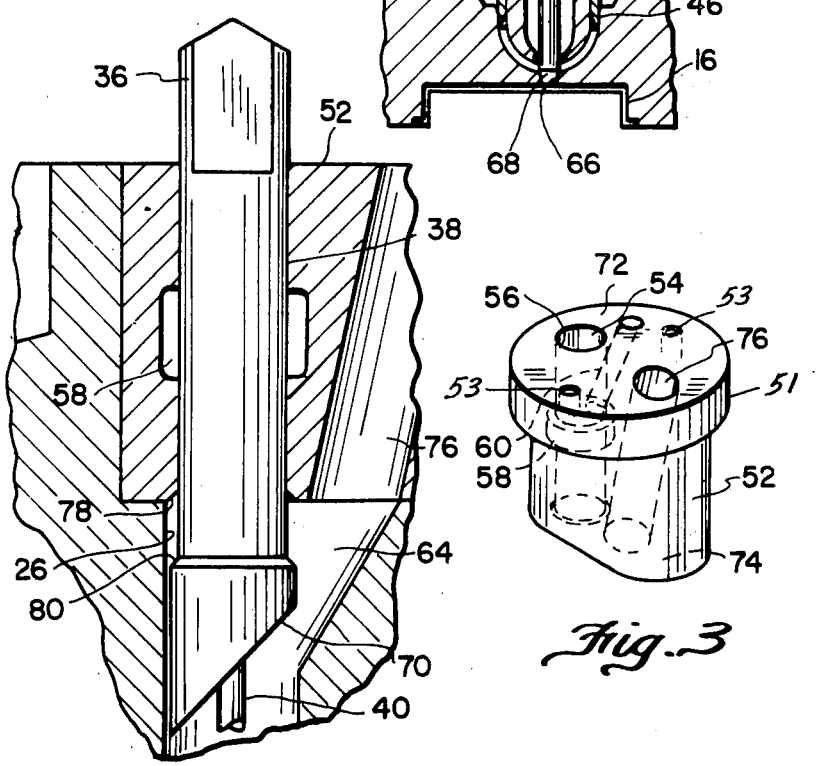
Fig. 2
Fig. 3

BUSHING SEAL FOR VALVE-GATED INJECTION MOLD

This invention relates to an improved bushing seal for a valve-gated injection mold.

The mechanism to which the invention relates includes a heater enclosed in the mold above a cavity with a reciprocating vertical valve pin extending through the heater. The valve pin is powered downwardly by force from an air operated piston transmitted to the upper end of the valve pin through a rocker arm. This arrangement is located beneath a molding machine from which molten plastic material is supplied through a hot runner passage in the mold and the heater to the cavity. The lower tip of the reciprocating valve pin seats in a gate in the mold leading to the cavity. The valve pin extends through a vertical central bore in the heater and the hot runner passage joins this bore part way down its length and the molten plastic material then flows to the gate through the bore around a smaller lower portion of the valve pin. This structure necessarily requires a seal around the upper portion of the valve pin to prevent leakage of the pressurized molten plastic material to the area of the rocker arm. Prior art mechanism of this general type are disclosed in the applicant's Canadian Pat. Nos. 840,892 issued May 5, 1970, 872,334 issued June 1, 1971 and 905,066 issued July 18, 1972.

In the past, this seal has been provided by a bushing seal which seats in a recess in the upper portion of the heater and has a cylindrical bore therethrough to reciprocally receive an upper portion of the valve pin. This arrangement has the disadvantage that the bushing seal must be meticulously hand honed to very close tolerances to avoid leakage of the hot pressurized molten plastic material. In spite of very meticulous workmanship in hand micro-finish honing the bushing seals, during use some of the molten plastic material seeps between the cylindrical walls of the bore and the reciprocating valve pin. It has been found that the shearing action of the reciprocating valve pin breaks down the plasticizers in certain molten plastic materials such as polycarbonate resulting in acid attack on and wear of the valve pin and bore surfaces. After continuous repeated use this results in the build up of solidified material around the upper portion of the valve pin, causing seizure of the mechanism and necessitating shut down and disassembly of the mold for cleaning.

In a multi-cavity mold arrangement, hot runner passages extend from a central molding machine through a manifold spreader plate to a heater located above each cavity. In the past, single cavity arrangements have similarly had the valve pin and cavity laterally offset from the molding machine to provide for a junction of the hot runner passage and the valve pin bore in the heater beneath the bushing seal. However, this arrangement has the disadvantage over locating the cavity and valve pin directly beneath the molding machine of requiring additional mold structure with accompanying increased expense.

Accordingly, it is an object of the present invention to at least partially overcome these disadvantages by providing an improved bushing seal for a heater of a valve-gated injection mold.

To this end, in one of its aspects, the invention provides a valve pin bushing seal for seating receipt in a heater of a valve-gated injection mold, said bushing seal having flat upper and lower faces and a vertical bore therebetween to reciprocally receive an upper portion of the valve pin therethrough, said bore having a smooth cylindrical wall interrupted by at least one circumferential opening in communication with atmosphere through a vent passage.

In another of its aspects, the invention further provides a valve pin bushing seal for seating receipt in a heater of a valve-gated injection mold, the bushing seal having flat upper and lower faces and a vertical bore therebetween to reciprocally receive an upper portion of the valve pin therethrough, the bushing having a circular inclined downwardly opening valve seal at the junction of the bore with the lower face, the valve seat adapted to sealingly receive an inclined shoulder on the valve pin when the valve pin is actuated to its uppermost position.

In a still further aspect, the invention provides a valve pin bushing seal for seating receipt in a heater of a valve-gated injection mold, said bushing having flat upper and lower faces and a vertical bore therebetween to reciprocally receive an upper portion of the valve pin therethrough, the bushing seal also having a hot runner passage therethrough extending between the upper and lower faces.

Further objects and advantages of the invention will appear from the following description taken together with the accompanying drawings in which:

FIG. 1 is a vertical sectional view showing a single cavity mold arrangement having a bushing seal according to a preferred embodiment of the invention;

FIG. 2 is an enlargement of a portion of the sectional view seen in FIG. 1, showing a portion of the bushing seal, an upper portion of the valve pin, and a portion of the surrounding mold; and FIG. 3 is a perspective view showing the embodiment of the bushing seal seen in FIGS. 1 and 2.

Reference is first made to FIG. 1 which shows a single cavity mold 10 positioned beneath a molding machine 12 with a heater 14 enclosed in the mold above a cavity 16. The mold 10 includes a cavity plate 18 and a back plate 20. Heater 14 which is heated by a circular electrical heater element 22 has a lower nozzle portion 24 and a central vertical cylindrical bore 26. An air operated piston 28 is located in a cylinder 30 in the cavity plate 18 lifts upward to pivot rocker arm 32 about pivot pin 34. The rocker arm 32 in turn depresses vertical valve pin 36 having a larger upper portion 38 and a smaller lower portion 40 located in the cylindrical bore 26 of the heater 14. This movement of the valve pin 36 is controlled by applying air pressure through air supply lines (not shown) to the cylinder 30 beneath the piston 28.

The heater 14 is securely positioned in the cavity plate 18 by insulation bushing 42. In order to reduce heat loss, heater 14 is spaced from the cavity plate 18 by air space 44. A cylindrical seal 46 formed of a titanium-steel alloy is located between the lower nozzle portion 24 of the heater 14 and the cavity plate 18 to prevent flow of the molten plastic material into the air space 44. The heater 14 has a well 48 in its upper surface 50 in which is received an oblong shaped bushing seal 52 formed of high speed steel. The bushing seal 52 has a circular upper portion 51 in which are located a pair of tapped holes 53 in which screws may be inserted to remove the bushing seal from the well 48. The bushing seal 52 has a vertical bore 54 which is in alignment with the bore 26 of the heater and receives the upper portion 38 of the valve pin 36. The cylindrical wall 56 of the bore 54 of the bushing seal 52 is interrupted by a circumferential opening 58 which is in communication with atmosphere adjacent the rocker pin 32 by vent passage 60 through the bushing seal 52 and the back plate 20.

Molten plastic material from the molding machine 12 is forced downward under pressure through a hot runner passage 62 which extends through the back plate 20 and the bushing seal 52 into the heater 14 where it joins the bore 26 of the heater 14 at the junction 64. The molten plastic material passes on downward through the bore 26 around the smaller lower portion 40 of the valve pin 36 where it passes through gate 66 into cavity 16. A valve is provided by the frusto-conical lower tip 68 of the valve pin 36 seating in gate 66. The larger upper portion 38 of the valve pin 36 joins the smaller lower portion 40 at shoulder 70 which slopes downwardly away from the hot runner passage 62 to avoid a dead spot for the accumulation of molten plastic material at junction 54. Rotation of the valve pin 36 to a position other than that shown is prevented by the structure of the upper portion of the valve pin and the rocker arm 32 described and claimed in the applicant's copending Canadian patent application.

As clearly seen in FIGS. 2 and 3, the bore 54 of the bushing seal 52 extends vertically through the seal between its flat upper face 72 and flat lower face 74. The bushing seal 52 also has a portion 76 of the hot runner passage 62 extending between these two surfaces, although it is slightly inclined to the vertical to join the bore 26 through the heater 14 adjacent the lower surface 74 of the bushing seal 52. The bore 54 of the bushing seal 52 is terminated at the lower face 74 by circular inclined valve seat 78 which receives a circular inclined shoulder 80 on the upper portion 38 of the valve pin 36 when the valve pin 36 is in its uppermost position. During use, some molten plastic material in the area of junction 64 is forced upward between the upper portion 38 of the valve pin 36 and the cylindrical wall 56 of the bore 54 of the bushing seal 52. In the past, the close tolerance between the valve pin and the wall of the order of 0.0002–0004 inches required to avoid excessive leakage of the molten plastic material resulted on the break down of the plasticizers of certain materials. This is due to the shearing action from the reciprocating motion of the valve pin on the material trapped in this confined space. This results in the formation of hot pressurized gases and acids which attack the surface of the valve pin and the wall of the bushing seal. The resulting corrosion, wear and build up of solidified material resulted in seizure of the valve pin, thereby shortening the operative life of the mechanism. The provision of the valve formed by inclined shoulder 80 and valve seat 78 avoids the leakage problem when the valve stem 36 is in its uppermost position. The provision of the circumferential opening 56 and vent passage 60 relieves the pressure on the material, allows harmful gases to escape and permits the material trapped between the valve stem and the wall of the bushing seal to remain partially fluid. The provision of this valve, together with the cicumferential opening and vent have been found to substantially extend the operative life span of the mechanism.

Although the disclosure describes and illustrates preferred embodiments of the bushing seal according to the invention, it is to be understood that the invention is not restricted to this particular form. For instance, it is apparent that the bushing seal could be formed of various other shapes and still provide the advantageous functions described above. Also the bushing seal may be provided with a number of vented openings spaced along its vertical bore.

What I claim is:

1. A valve pin bushing seal for seating receipt in a heater of a single cavity valve-gated injection mold, said bushing seal having flat upper and lower faces and a vertical bore therebetween to reciprocally receive an upper portion of the valve pin therethrough, said bushing seal having a hot runner passage therethrough extending between the upper and lower faces, said hot runner passage being separate from said vertical bore.

2. A valve pin bushing seal for seating receipt in a heater of a single cavity valve-gated injection mold, said bushing seal having flat upper and lower faces and a vertical bore therebetween to reciprocally receive an upper portion of the valve pin therethrough, said bushing having the combination of:
   a. a hot runner passage extending therethrough between the upper and lower faces separate from the said vertical bore,
   b. said vertical bore having a smooth cylindrical wall interrupted by at least one circumferential opening in communication with atmosphere through a vent passage, and
   c. a circular inclined downwardly opening valve seat at the junction of the vertical bore with the lower face, the valve seat adapted to sealingly receive an inclined shoulder on the valve pin when the valve pin is actuated to its uppermost position, whereby the cavity may be located in vertical alignment with a molding machine without leakage of highly pressurized molten plastic material past the valve pin.

* * * * *